US011202301B2

United States Patent
Sanghavi et al.

(10) Patent No.: US 11,202,301 B2
(45) Date of Patent: Dec. 14, 2021

(54) SELF-LEARNING RATE ACCESS PRIORITIZER FOR APPLICATIONS IN A WIRELESS NETWORK

(71) Applicant: HEWLETT PACKARD ENTERPRISE DEVELOPMENT LP, Houston, TX (US)

(72) Inventors: Hardik Sanghavi, Bangalore (IN); Mahesh Dantakale, Bangalore (IN); Santosh Jayawadagi, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 95 days.

(21) Appl. No.: 16/424,684

(22) Filed: May 29, 2019

(65) Prior Publication Data

US 2020/0383121 A1   Dec. 3, 2020

(51) Int. Cl.
*H04L 12/26* (2006.01)
*H04W 72/10* (2009.01)
*H04W 24/08* (2009.01)

(52) U.S. Cl.
CPC ........... *H04W 72/10* (2013.01); *H04L 43/028* (2013.01); *H04L 43/0882* (2013.01); *H04W 24/08* (2013.01)

(58) Field of Classification Search
None
See application file for complete search history.

(56) References Cited

U.S. PATENT DOCUMENTS

| 8,023,482 | B2 | 9/2011 | Gong et al. |
| 8,713,196 | B1 | 4/2014 | Gormley |
| 9,030,935 | B2 | 5/2015 | Neeser |
| 9,465,622 | B2 * | 10/2016 | Jagatheesan .......... G06F 9/4401 |
| 9,742,490 | B1 * | 8/2017 | Anand ............... H04Q 11/0066 |
| 10,028,203 | B2 * | 7/2018 | Akkarakaran ........ H04W 48/12 |

(Continued)

OTHER PUBLICATIONS

Brocade Adaptive Rate Limiting (White Paper), May 19, 2015, 12 Pgs.

(Continued)

*Primary Examiner* — Sithu Ko
(74) *Attorney, Agent, or Firm* — Nolte Lackenbach Siegel

(57) ABSTRACT

A self-learning rate access prioritizer for high-priority applications in a wireless network is provided herein. The self-learning rate access prioritizer includes a method of assigning an application rate limiter for each high-priority network software application. The method further includes employing an assigned application rate limiter to determine the present bandwidth for a first high-priority network software application. Next, the method includes re-provisioning bandwidth to the first high-priority network software application in response to a ratio of a first bandwidth of the first high-priority network software application and a provisioned bandwidth for the first high-priority network software application. Furthermore, the method includes re-provisioning bandwidth from the first high-priority network software application in response to the ratio being less than a low utilization ratio assigned to the first high-priority network software application. In addition, the method includes iterating for each active high-priority network software application on a network.

20 Claims, 11 Drawing Sheets

(56) References Cited

U.S. PATENT DOCUMENTS

| | | | |
|---|---|---|---|
| 10,587,583 B2* | 3/2020 | Aluvala | H04L 47/825 |
| 10,674,381 B2* | 6/2020 | Dhanapal | H04W 28/0231 |
| 10,924,356 B2* | 2/2021 | Yu | H04L 41/5022 |
| 2012/0140633 A1* | 6/2012 | Stanwood | H04L 47/2425 370/235 |
| 2012/0213114 A1* | 8/2012 | Chen | H04L 1/0017 370/252 |
| 2015/0289279 A1* | 10/2015 | Xu | H04W 72/0486 370/329 |
| 2015/0331815 A1* | 11/2015 | Dai | G06F 13/34 710/109 |
| 2015/0372977 A1* | 12/2015 | Yin | H04L 63/0272 726/1 |
| 2018/0219741 A1 | 8/2018 | Thompson | |
| 2019/0109799 A1* | 4/2019 | Nipane | H04L 45/64 |
| 2019/0261392 A1* | 8/2019 | Morris | H04W 72/1284 |

OTHER PUBLICATIONS

Huang, H. et al., A Dynamic Network Bandwidth Allocation Mechanism Under Network QoS Constraints, (Research Paper), Smart City/SocialCom/SustainCom (SmartCity), Dec. 19-21, 2015, 3 Pgs.

* cited by examiner

SELF-LEARNING RATE ACCESS PRIORITIZER FOR APPLICATIONS IN A WIRELESS NETWORK

BACKGROUND

Application rate limiters are used in network elements to reserve bandwidth for a high-priority application or a list of high-priority network software applications. Currently, network administrators are tasked with determining the amount of bandwidth available on a network to allocate to a network software application to achieve a desired quality of service. The allocated bandwidth may not always be accurate as it may fall short of the quality of service requirements. In some cases, the bandwidth allocated to a network software application may be too high and under-utilized which may affect the performance of other hosted network software applications.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
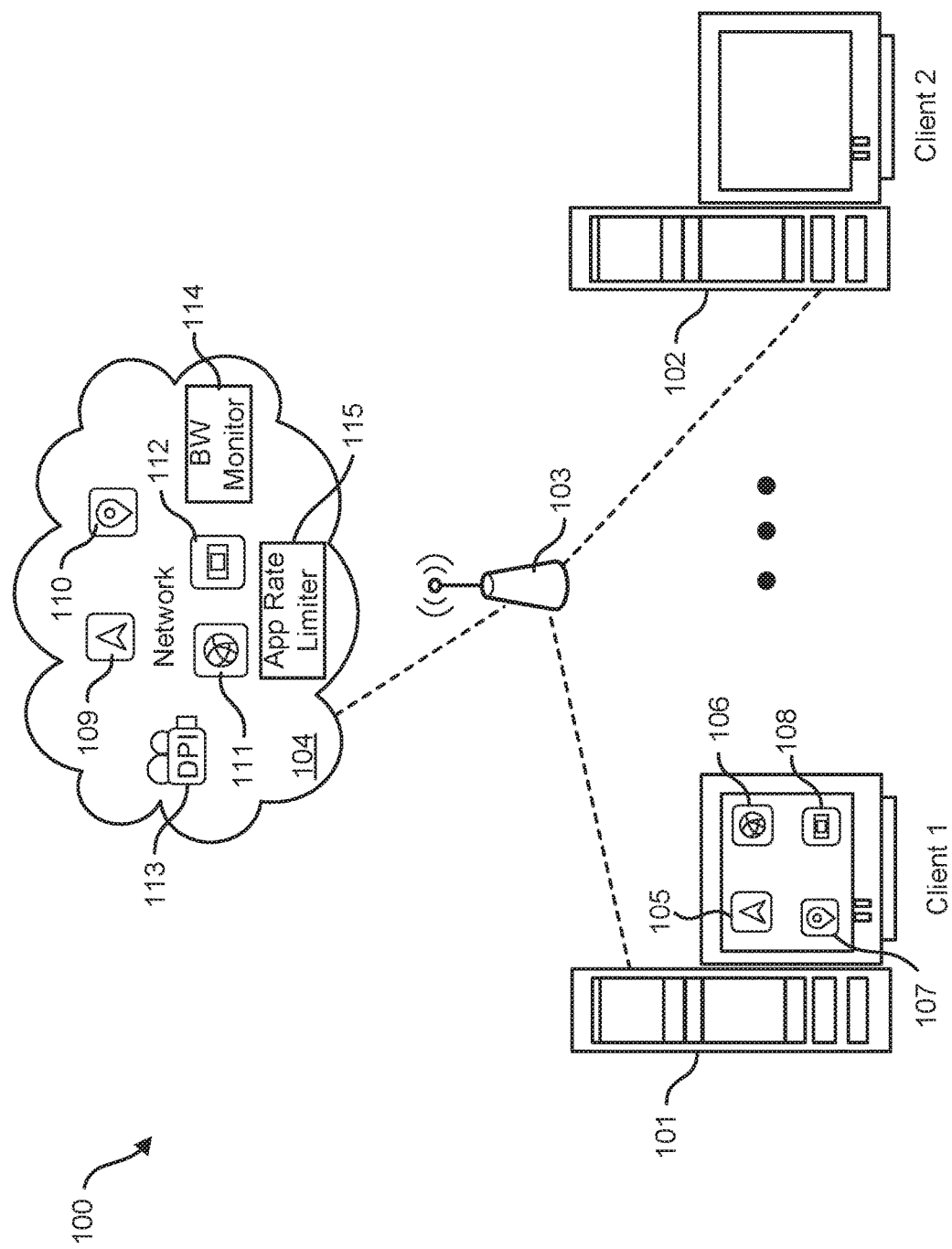
FIG. 1 is an illustration of a network which may implement a system and method consistent with the present disclosure.

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

Where a range of values is provided, it is understood that each intervening value, to the tenth of the unit of the lower limit unless the context clearly dictates otherwise, between the upper and lower limit of that range, and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also included in the disclosure.

The present disclosure provides a manner to solve the problem of improving utilization of bandwidth among network software applications, particularly high-priority network software applications. The present disclosure employs a self-learning rate-limiter that fine tunes the bandwidth allocated for each application rate limiter based on each high-priority network software application's usage. Advantageously, the present disclosure provides a manner to effect dynamic tweaking of the rates assigned to each application rate limiter based on the current utilization of high-priority network software applications. In addition, a Bandwidth Monitoring Engine can be employed to determine when a network application is approaching a peak bandwidth usage of bandwidth allotted and in response can allocate additional bandwidth thereto. In some implementations, a Bandwidth Monitoring Engine calculates an actual bandwidth for each network traffic flow in a firewall.

Moreover, the present disclosure can be used to relinquish the unused bandwidth allocated to a network software application if an actual bandwidth usage is less than a low utilization ratio (LUR) of an allotted bandwidth. Herein, a LUR is defined as a ratio of an actual bandwidth consumed by a network software application to an allocated application bandwidth. In some implementations, the LUR can be employed to reduce (e.g., decrement) an allocated bandwidth for a network software application.

Now turning to the drawings, FIG. 1 is an illustration of a network 100 which may implement a system and method consistent with the present disclosure. The network 100 includes a cloud network system 104 communicatively coupled to one or more client devices via a network device (e.g., an access point 103). Cloud network system 104 may include computing components (e.g., hardware and software infrastructure) that enable the delivery of cloud computing services via a network (i.e., the Internet). For example, cloud network system 104 may include a network of remote servers connected over the Internet.

In the implementation shown, the client devices include personal computers 101, 102. However, one having ordinary skill in the art should appreciate that the present disclosure is not limited thereto. For example, the client devices employed within the network 100 may include, but are not limited to, desktop computers, laptop computers, tablets, and smartphones.

Personal computer 101 may host several network software applications 105-108 thereon. Herein, a network software application is defined as a software application that utilizes the Internet or other network hardware infrastructure to perform useful functions. Network software applications 105-108 may be any of a customer relationship management software application, a project management software application, an enterprise resource planning software application, a business intelligence software application, a web conferencing software application, an email software application, a word processing suite of software applications, etcetera.

In one implementation, the network software applications 105-108 may be classified as a high-priority network software application or a lower-priority network software application (e.g., low-priority network software application). High-priority network software applications may be software applications which are given preference over low-priority network software applications with regards to bandwidth. For example, an email application may be implemented as a high-priority network software application whereas a chat-based messaging software application may be implemented as a low-priority network software application.

As will be described in more detail below, the present disclosure may provide better utilization for high-priority network software applications by dynamically changing the bandwidth allotted for each hosted network software application. In some implementations, the high-priority network software application includes ingress network traffic to the high-priority network software application and/or egress network traffic from the high-priority network software application.

Cloud network system 104 includes an application rate limiter 115. Herein, an application rate limiter 115 is a network element that is used to reserve bandwidth for a network software application (e.g., high-priority network software application). In some implementations, the application rate limiter 115 controls the rate of ingress and egress based on the high-priority network software application classified for each network traffic flow. In addition, cloud network system 104 includes a bandwidth monitor 114. In some implementations, a unique application rate limiter 115 is assigned to each high-priority network software application. In other implementations, an application rate limiter 115 is assigned to more than one network software application.

Bandwidth monitor 114 may be a network element that monitors the bandwidth associated with network software applications hosted on the cloud network system 104. Lastly, cloud network system 104 may host a deep packet inspection (DPI) network element 113 that employs DPI. Herein, DPI is defined as a packet filtering mechanism that classifies packets with specific data or code payloads. DPI network element 113 may associate each network traffic flow within a firewall with a particular high-priority network software application. In one implementation, the DPI network element 113, the bandwidth monitor 114, and the application rate limiter 115 may be employed within the cloud network system 104 to identify and dynamically change the bandwidth associated with the high-priority network software applications hosted on the network 104.

The high-priority network software applications 105-108 hosted on the personal computer 101 may be hosted by the cloud network system 104 as illustrated by the corresponding cloud software applications 109-112. In one implementation, the DPI network element 113, the bandwidth monitor 114, and the application rate limiter 115 may all interact with the cloud software applications 109-112 to provision or re-provision bandwidth for each high-priority network software application 105-108.

Figure 2:
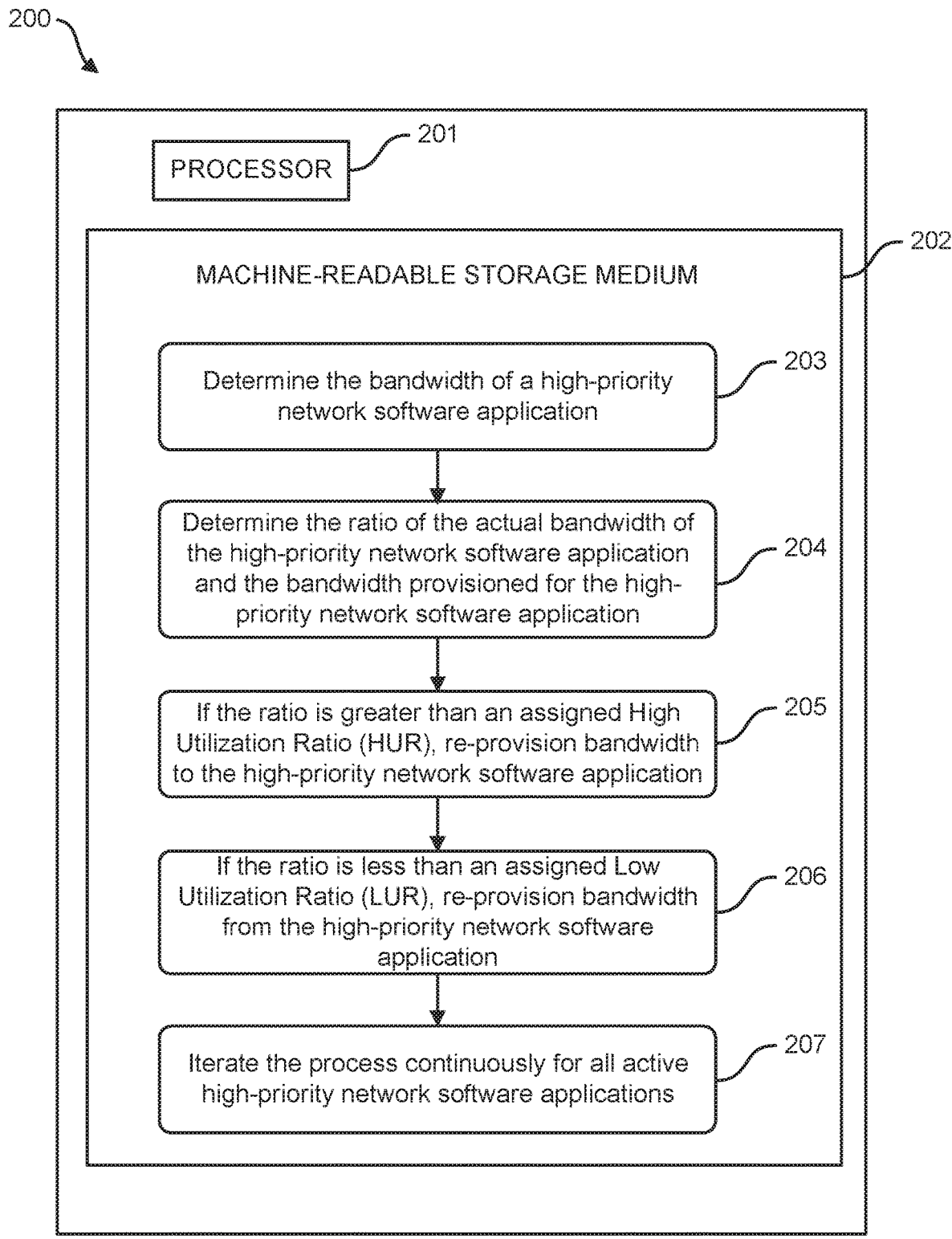
FIG. 2 is an illustration of a computing system, according to one or more examples of the present disclosure.

FIG. 2 is an illustration of a computing system 200, according to one or more examples of the present disclosure. The computing system 200 may include a non-transitory computer readable medium 202 that includes computer executable instructions 203-207 stored thereon that, when executed by one or more processing units 201 (one processor shown), causes the one or more processing units 201 to prioritize network software applications on a network, according to one implementation of the present disclosure.

Computer executable instructions 203 include determining the bandwidth of a high-priority network software application. After the bandwidth of the high-priority network software application is determined, computer executable instructions 204 include determining the ratio of the actual bandwidth of the high-priority network software application and the bandwidth provisioned for the high-priority network software application. After determining this ratio, computer executable instructions 205 include re-provisioning the bandwidth to the high-priority network software application if the ratio is greater than an assigned High Utilization Rate (HUR). Herein, a HUR is defined as a ratio of an actual bandwidth consumed by a high-priority network software application to an allocated network software application bandwidth. In some implementations, a HUR may be employed to increase (e.g., increment) an allocated bandwidth of a high-priority network software application.

In addition, after determining this ratio, computer executable instructions 206 include re-provisioning bandwidth from the high-priority network software application if the ratio is less than an assigned Low Utilization Rate (LUR). Furthermore, after re-provisioning bandwidth to the high-priority network software application, computer executable instructions 207 include iterating the process continuously for all active high-priority network software applications on a network.

Figure 3:
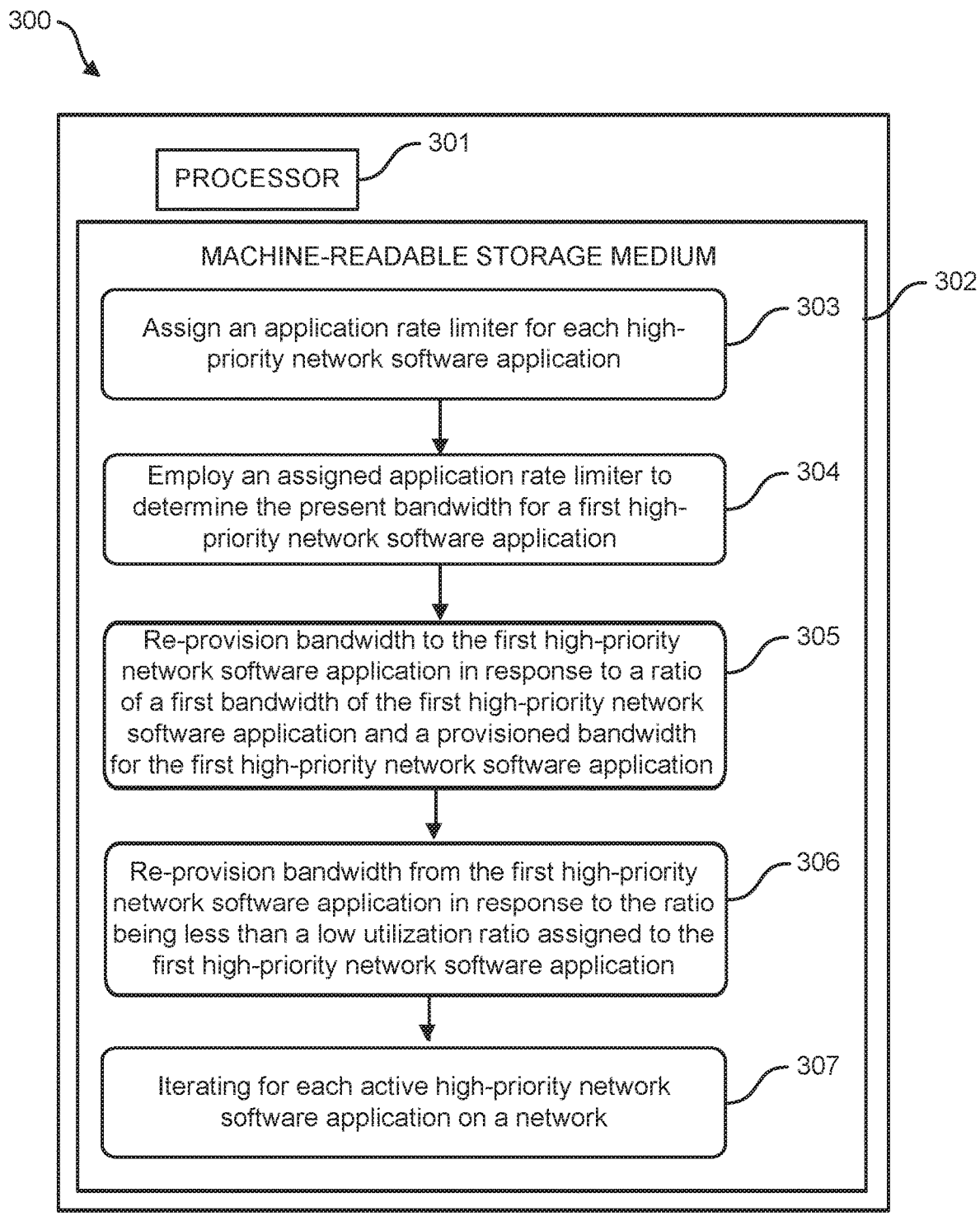
FIG. 3 is an illustration of yet another computing system, according to one or more examples of the present disclosure.

FIG. 3 is an illustration of a computing system 300, according to one or more examples of the present disclosure. The computing system 300 may include a non-transitory computer readable medium 302 that includes computer executable instructions 303-307 stored thereon that, when executed by one or more processing units 301 (one processor shown), causes the one or more processing units 301 to manage bandwidth for high-priority network software applications, according to one implementation of the present disclosure.

Computing system 300 includes computer executable instructions 303 includes assigning an application rate limiter for each high-priority network software application. In addition, computing system 300 includes computer executable instructions 304 which includes employing an assigned application rate limiter to determine the present bandwidth for a first high-priority network software application. Furthermore, computing system 300 includes computer executable instructions 305 which includes re-provisioning bandwidth to the first high-priority network software application in response to a ratio of a first bandwidth of the first high-priority network software application and a provisioned bandwidth for the first high-priority network software application. In addition, computer system 300 includes computer executable instructions 306 which includes re-provisioning bandwidth from the first high-priority network software application in response to the ratio being less than a low utilization ratio assigned to the first high-priority network software application. Finally, a computer system 300 includes computer executable instructions 307 which includes iterating the process continuously for all active high-priority network software application.

In addition, computing system includes computer executable instructions which include classifying each active high-priority network software application according to traffic flow through a firewall and computer executable instructions which include determining the total bandwidth for each active high-priority network software applications on the network.

Figure 4:
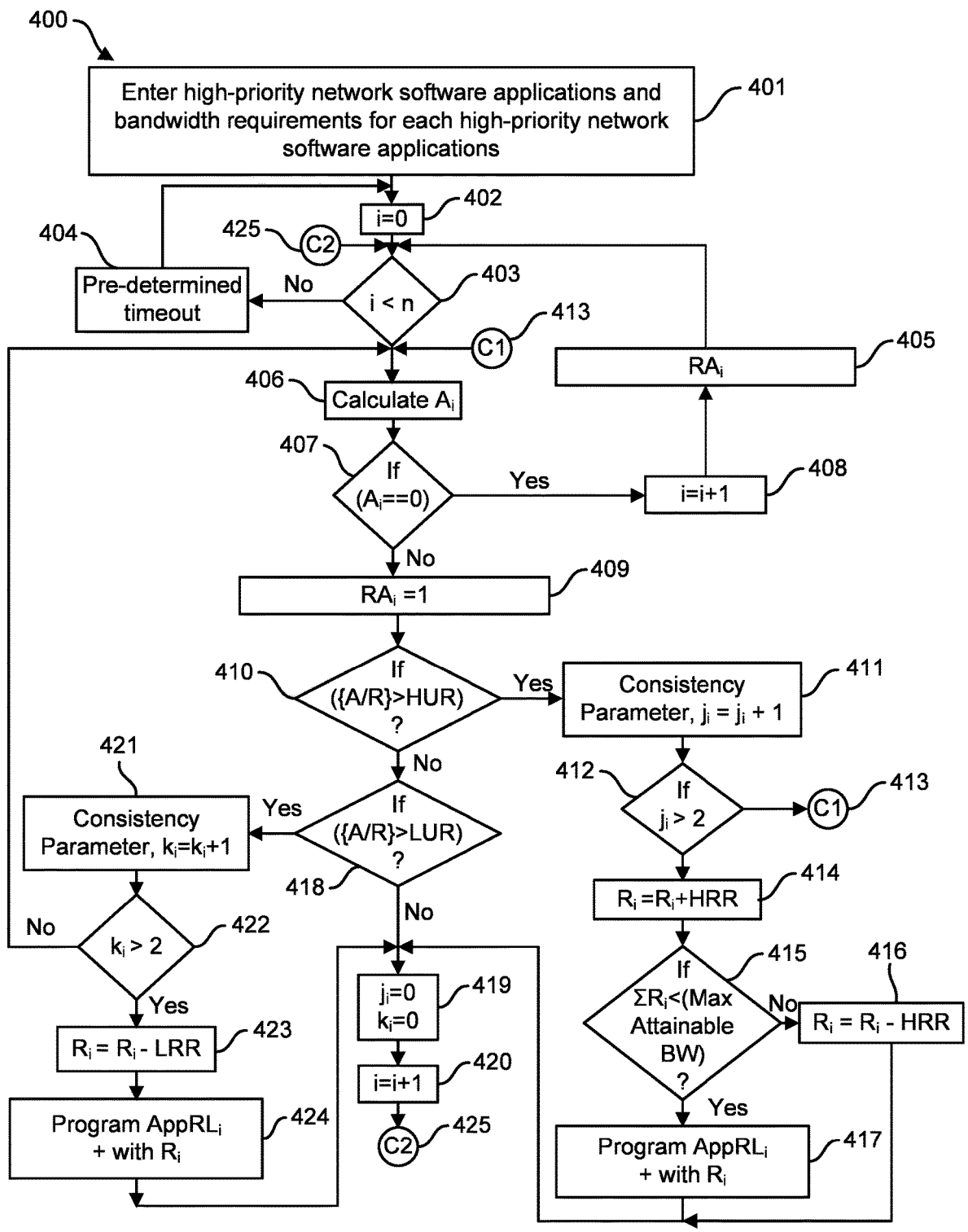
FIG. 4 is a flowchart of a method for implementing a self-learning rate access prioritizer for high-priority network software applications hosted on a network, according to one or more examples of the present disclosure.

FIG. 4 is a flowchart of a method 400 for implementing a self-learning rate access prioritizer for high-priority network software applications in a wireless network, according to one implementation of the present disclosure. Method 400 may be implemented within the example network 100 shown in FIG. 1. Method 400 includes determining the network bandwidth, the number of high-priority network software applications, and the bandwidth requirements for each high-priority network software application active on a network (block 401). It should be understood, however, that method 400 is not limited to managing bandwidth of high-priority network software applications and may be further employed for low-priority network software applications. Accordingly, method 400 includes tracking a number of times that the present utilization of each high-priority network software application is determined. If the utilization for the high-priority network software application is maintained above the HUR or below the LUR for a sustained period of time, bandwidth can be re-provisioned according to method 400.

Block 402 provides that a counter (e.g., "i") is set to 0 to indicate the first time that the utilization of a high-priority network software application is determined for a triggered condition. In one implementation, the counter "i" runs through all user specified "n" high-priority network software applications, where "i" indicates the $i^{th}$ high-priority network software application. Once all of the high-priority network software applications are cycled through, a pre-determined timeout may be enacted (block 404).

Furthermore, if the utilization level trips a threshold condition (e.g., <LUR or >HUR), the counter may be incremented to determine the length of time that the condition is maintained. If after the counter is incremented (block 403), i<n (where n is a pre-determined value), the present bandwidth of the high-priority network software application is determined (block 406). Otherwise, a timeout is instituted for a pre-determined time (block 404).

In addition, if the counter is incremented, it is determined whether the current bandwidth of a high-priority network software application is equal to zero (block 407). If this condition is true, the counter is incremented (block 408) and the Boolean regulatory list for high-priority network software applications in an application rate limiter is set to zero (block 405). In addition, it is determined whether the counter is less than 'n' high-priority network software applications (block 403).

Alternatively, if the condition in block 407 is not true, the method 400 proceeds to block 409 where the Boolean regulatory list for the high-priority network software application is set to '1.' Next, according to block 410, the ratio of the actual bandwidth of the high-priority network software application to the provisioned bandwidth for a high-priority network software application is compared to the HUR. If the ratio is greater than the HUR, the method 400 proceeds to block 411. Alternatively, if the ratio is less than the HUR, the method 400 proceeds to block 418.

According to block 411, a first consistency parameter (e.g., 'j') is incremented (e.g., j=j+1). Notably, the first consistency parameter may be used to prevent premature action in response to false positives (e.g., momentary spikes in the actual bandwidth for high-priority network software applications). In other implementations, a timer may be employed to determine whether a network or individual high-priority network software application bandwidth is sustained for a minimum time period before corrective action is applied to the network.

Next, according to block 412, if it is determined that the first consistency parameter is greater than a pre-determined value (e.g., '2'), the provisioned bandwidth is increased (block 414). For example, the provisioned bandwidth may be set to increase by a high reconciliation rate (e.g., $R_i=R_i+HRR$). Herein, a high reconciliation rate (HRR) is defined as a rate at which the current bandwidth allocated for the high-priority network software application is to be increased (e.g., incremented). In some implementations, the HRR is expressed as a percentage of an available bandwidth on a network. Alternatively, if the increased first consistency parameter is not greater than the pre-determined value, the method 400 returns to block 406.

Next, the method 400 proceeds to block 415, where it is determined whether the summation of the provisioned bandwidth for each high-priority network software application active on the network is less than the maximum attainable bandwidth available for the network. Herein, a maximum attainable bandwidth is defined as the maximum bandwidth available for all of the application rate limiters, collectively.

If the condition presented in block 415 is true, the increased provisioned bandwidth is affirmed. According to block 417, for example, an application rate limiter is programmed with the increased provisioned bandwidth in the high-priority network software application. Alternatively, if the condition in block 415 is not true, the increase in provisioned bandwidth set to be allocated to the high-priority network software application (block 414) is denied as otherwise doing so would increase the overall provisioned bandwidth for the active high-priority network software applications beyond the maximum attainable bandwidth. Otherwise, the additional bandwidth is re-provisioned back to the network according to block 416 ($R_i=R_i-HRR$).

Returning to block 410, if the condition (e.g., the ratio of the actual bandwidth of the high-priority network software application with its provisioned bandwidth is greater than the HUR) is untrue, the method 400 proceeds to block 418. Next, according to block 418, determine whether the ratio of the bandwidth of the high-priority network software application to the provisioned bandwidth for said high-priority network software application is less than the LUR.

If the condition in block 418 is true, the method 400 proceeds to block 421 where a second consistency parameter (e.g., 'k') is incremented. Notably, the second consistency parameter may be used to prevent premature action in response to false positives. In addition, the second consistency parameter may be used to determine when the LRR is to be applied. However, as described above, the first consistency parameter (e.g., "j") maybe used to determine when the HRR is to be applied.

Next, according to block 422, it is determined whether the second consistency parameter is greater than a pre-determined value (e.g., '2'). If the condition in block 422 is true, the method 400 proceeds to block 423 where the provisioned bandwidth ($R_i$) of the high-priority network software application is reduced by a low reconciliation rate (e.g., $R_i=R_i-LRR$). Herein, a low reconciliation rate (LRR) is defined as a rate at which the current bandwidth allocated for the high-priority network software application is to be decremented. Next, according to block 424, the application rate limiter assigned to the high-profile network software application is programmed with the new provisioned bandwidth ($R_i$).

Alternatively, if the condition in block 418 is not true, the first consistency parameter and the second consistency parameter are both set to zero (block 419). In addition, the counter is incremented (e.g., i=i+1) according to block 420. Next, the method 400 returns to block 403 according to block 425. Accordingly, the method continues iterating to monitor the bandwidth levels of each high-priority network software application. In addition, the method described in relation to flowchart 400 can be implemented for each active high-priority network software application sequentially or simultaneously.

Figure 5:
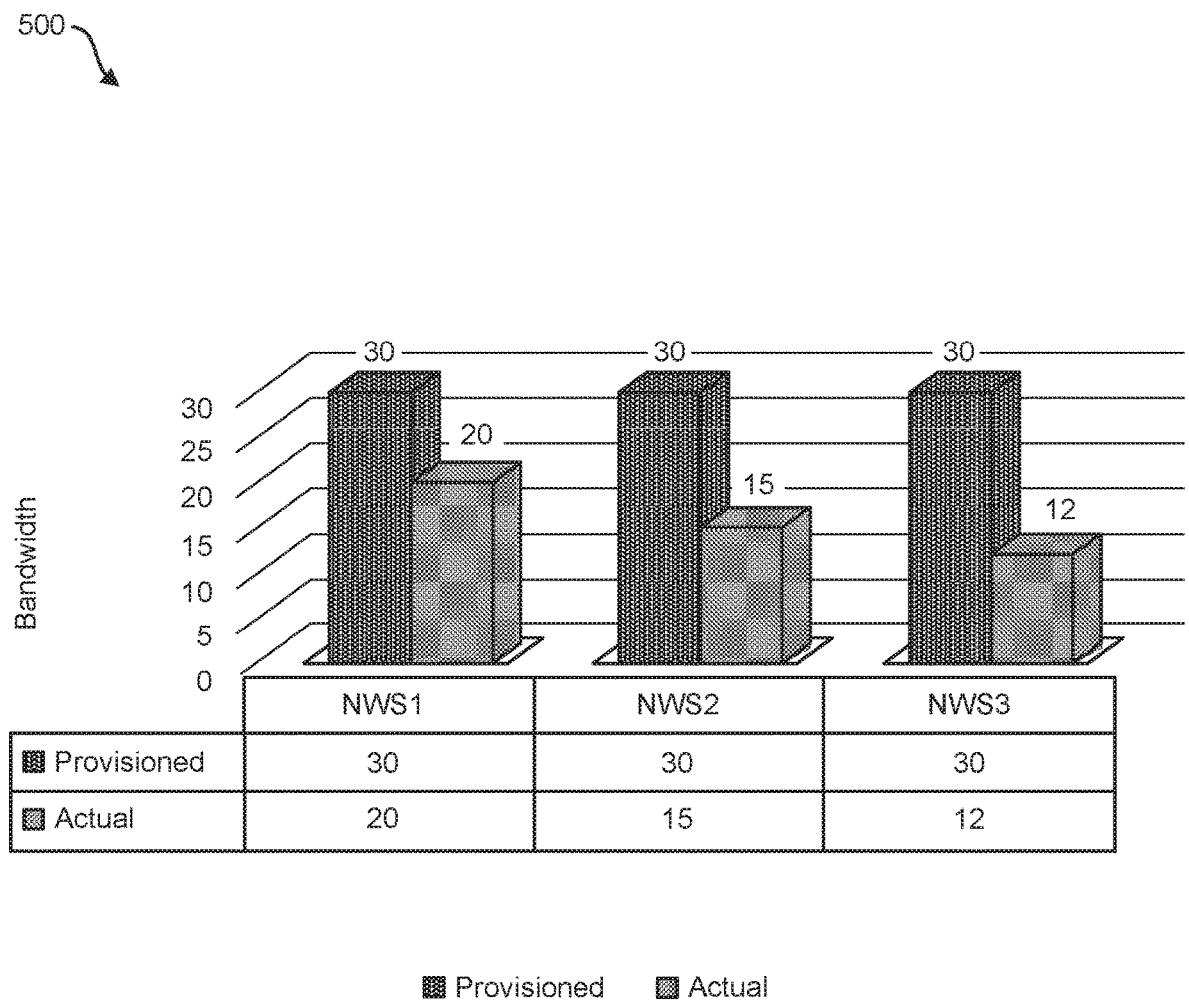
FIG. 5 is a bar graph which displays provisioned and actual bandwidths for example high-priority network software applications.

FIG. 5 is a bar graph 500 which displays the provisioned and actual bandwidths for example high-priority network software applications. The bar graph 500 represents a first iteration of the method described in FIG. 4 for the example high-priority network software applications. In one implementation, an application rate limiter can be used to provision bandwidth for a first high-priority network software application (NWS1), a second high-priority network software application (NWS2), and a third high-priority network software application (NWS3). For example, the bar graph 500 shows that although the NWS1 has been provisioned a bandwidth of 30 Mbps, the actual bandwidth that is being used is approximately 20 Mbps which is less than the provisioned amount.

Likewise, the bar graph 500 shows that although the NWS2 has been provisioned a bandwidth of 30 Mbps, the actual bandwidth that is being used by NWS2 is approximately 15 Mbps which is significantly less than the provisioned amount. Furthermore, NWS3 has been provisioned a bandwidth of 30 Mbps although the actual bandwidth that is being used is approximately 12 Mbps. Accordingly, a system and method herein may be used to re-provision bandwidth based on the actual bandwidth (e.g., utilization) of each network software application (e.g., high-priority network software application).

In the example illustrated in FIG. 5, the network bandwidth is 100 Mbps, the maximum attainable bandwidth is 90% of the network bandwidth (e.g., 90 Mbps) and the number of network software applications (e.g., high-priority network software applications) is three. For the example shown in FIG. 5, the HUR is 90%, the LUR is 70%, the HRR is 20% (i.e., 20% of the available bandwidth), and the LRR is 20% (i.e., 20% of the provisioned bandwidth). Accordingly, the method disclosed herein may be employed to re-provision bandwidth to and from the high-priority network software applications (e.g., NWS1, NWS2, and NWS3) thereby managing the bandwidth of each high-priority network software application active on the network.

In the example shown, the actual bandwidth for NWS1 is 20 Mbps and therefore the $A_1/R_1$ ratio (e.g., approximately 0.67) is less than the HUR (e.g., 0.90) and notably less than the LUR (e.g., 0.70). Accordingly, because the $A_1/R_1$ ratio is less than the LUR, the system re-provisions bandwidth from the NWS1 back to the network. Since the LRR is 20%, after provisioning bandwidth from the NWS1, the updated provisioned bandwidth ($R_1$) for NWS1 is 24 Mbps.

Likewise, the actual bandwidth for NWS2 is 15 Mbps and the ratio ($A_2/R_2$) of the actual bandwidth ($A_2$) of NWS1 and its provisioned bandwidth ($R_2$) is 0.50 which is therefore less than the HUR (e.g., 0.90) and notably less than the LUR (e.g., 0.70). Accordingly, because the $A_2/R_2$ ratio is less than the LUR, the system re-provisions bandwidth from the NWS2 back to the network. For an LRR of 20%, after provisioning bandwidth from the NWS2, the updated provisioned bandwidth ($R_2$) for NWS2 is 24 Mbps.

Furthermore, the actual bandwidth for NWS3 is 12 Mbps and the $A_3/R_3$ is 0.40 which is less than the HUR (e.g., 0.90) and notably less than the LUR (e.g., 0.70). As such, because the actual bandwidth is less than the LUR, the system re-provisions bandwidth from the NWS3 back to the network. For an LRR of 20%, after provisioning bandwidth from the NWS3, the updated provisioned bandwidth ($R_3$) for NWS3 is 24 Mbps.

Although the ratios ($A_1/R_1$, $A_2/R_2$, and $A_3/R_3$) of the actual bandwidths of NWS1, NWS2, and NWS3 and their provisioned bandwidth are not above the HUR in this example, if they were, a HRR of 20% (e.g., 8 Mbps) yields additional bandwidth so long as the bandwidths for NWS1, NWS2, and NWS3 do not exceed the maximum attainable bandwidth (e.g., 90 Mbps).

Figure 6:
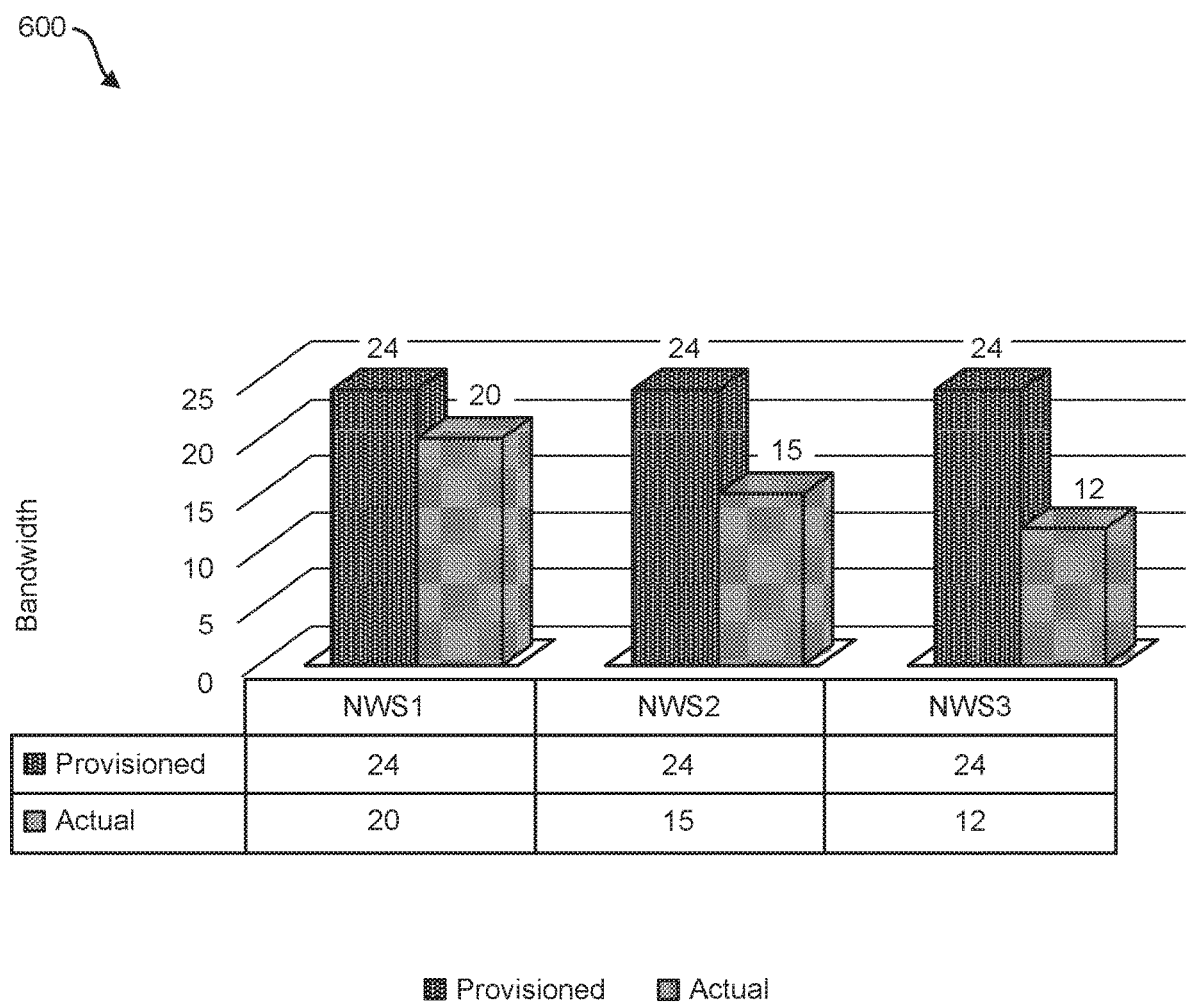
FIG. 6 is a bar graph which displays re-provisioned and actual bandwidths for example high-priority network software applications.

FIG. 6 is a bar graph 600 which displays the re-provisioned and actual bandwidths for example high-priority network software applications. The bar graph 600 represents a second iteration of the method described in FIG. 4 for a few example high-priority network software applications. In the example shown in bar graph 600, the provisioned and actual bandwidths are a result of the re-provisioning performed in the example illustrated in FIG. 5. As shown, the actual bandwidths for NWS1, NWS2, and NWS3 remain at approximately 20 Mbps, 15 Mbps, and 12 Mbps, respectively, and the provisioned bandwidths for NWS1, NWS2, and NWS3 are set at 24 Mbps. Because the $A_1/R_1$ ratio for NWS1 is 0.8333 which is less than the HUR (e.g., 0.9) but greater than the LUR (e.g., 0.70), the provisioned bandwidth ($R_1$) for the NWS1 remains the same.

Furthermore, the actual bandwidth of NWS2 is 15 Mbps and the $A_2/R_2$ ratio is 0.625 which is less than the HUR (e.g., 0.90) and notably less than the LUR (0.70). Accordingly, because the $A_2/R_2$ ratio of NWS2 is less than the LUR, the system re-provisions additional bandwidth from NWS2 back to the network. As the LRR is 20%, the new provisioned bandwidth ($R_2$) for NWS2 is 19.2 Mbps which is 4.8 Mbps less than the previously provisioned amount.

Further, the $A_3/R_3$ ratio of NWS3 is 0.50 which is less than the HUR (0.90) and notably less than the LUR (e.g., 0.70). Accordingly, the system again re-provisions bandwidth from NWS3 back to the network. In this example, since the LRR is 20%, the new provisioned bandwidth ($R_3$) is 19.2 Mbps which is 4.8 Mbps less than the previously provisioned amount. Notably, the re-provisioned bandwidth for NWS3 is still below the LUR.

Figure 7:
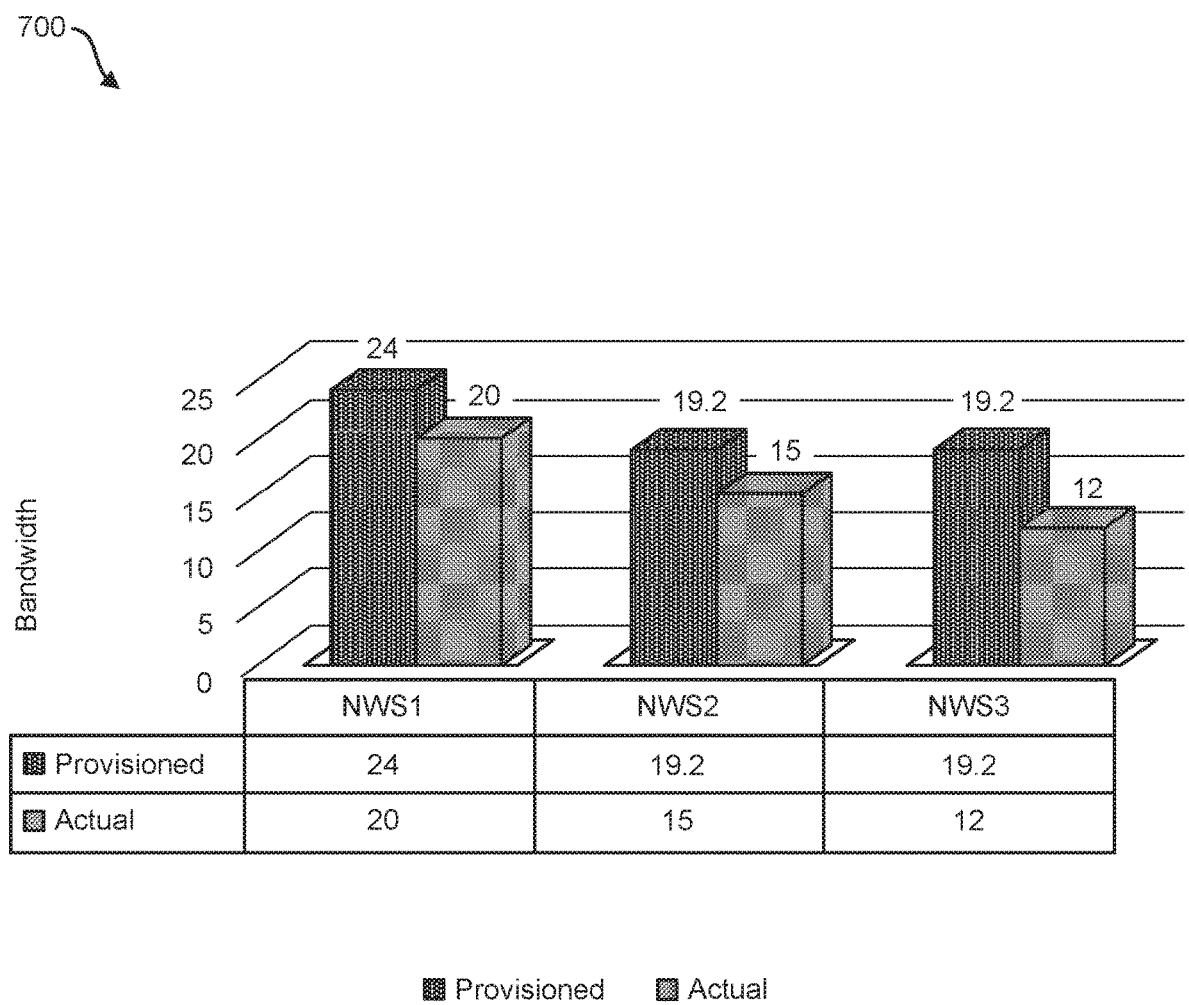
FIG. 7 is a bar graph which displays re-provisioned and actual bandwidths for example high-priority network software applications.

FIG. 7 is a bar graph 700 which displays the re-provisioned and actual bandwidths for example high-priority network software applications. The bar graph 700 represents a third iteration of the method described in FIG. 4 with respect to NWS1, NWS2, and NWS3. In the example shown in bar graph 700, the provisioned and actual bandwidths are a result of the re-provisioning performed in the example illustrated in FIG. 6. As shown, the actual bandwidths for NWS1, NWS2, and NWS3 remain at approximately 20 Mbps, 15 Mbps, and 12 Mbps, respectively, and the provisioned bandwidths for NWS1, NWS2, and NWS3 are set at 24 Mbps, 19.2 Mbps, and 19.2 Mbps, respectively. Because the $A_1/R_1$ ratio for NWS1 is approximately 0.83 which is less than the HUR (e.g., 0.90) but greater than the LUR (e.g., 0.70), the provisioned bandwidth ($R_1$) for the NWS1 remains the same.

In addition, the actual bandwidth of NWS2 is 15 Mbps and the $A_2/R_2$ ratio is 0.78 which is less than the HUR (e.g., 0.90) but greater than the LUR (0.70). Therefore, the provisioned bandwidth ($R_2$) for the NWS2 remains the same. Furthermore, the $A_3/R_3$ ratio is 0.625 which is less than the HUR (e.g., 0.90) and notably less than the LUR (e.g., 0.70). As such, the system re-provisions bandwidth from NWS3 back to the network. In this example, since the LRR is 20%, the new provisioned bandwidth ($R_3$) is 15.36 Mbps.

Figure 8:
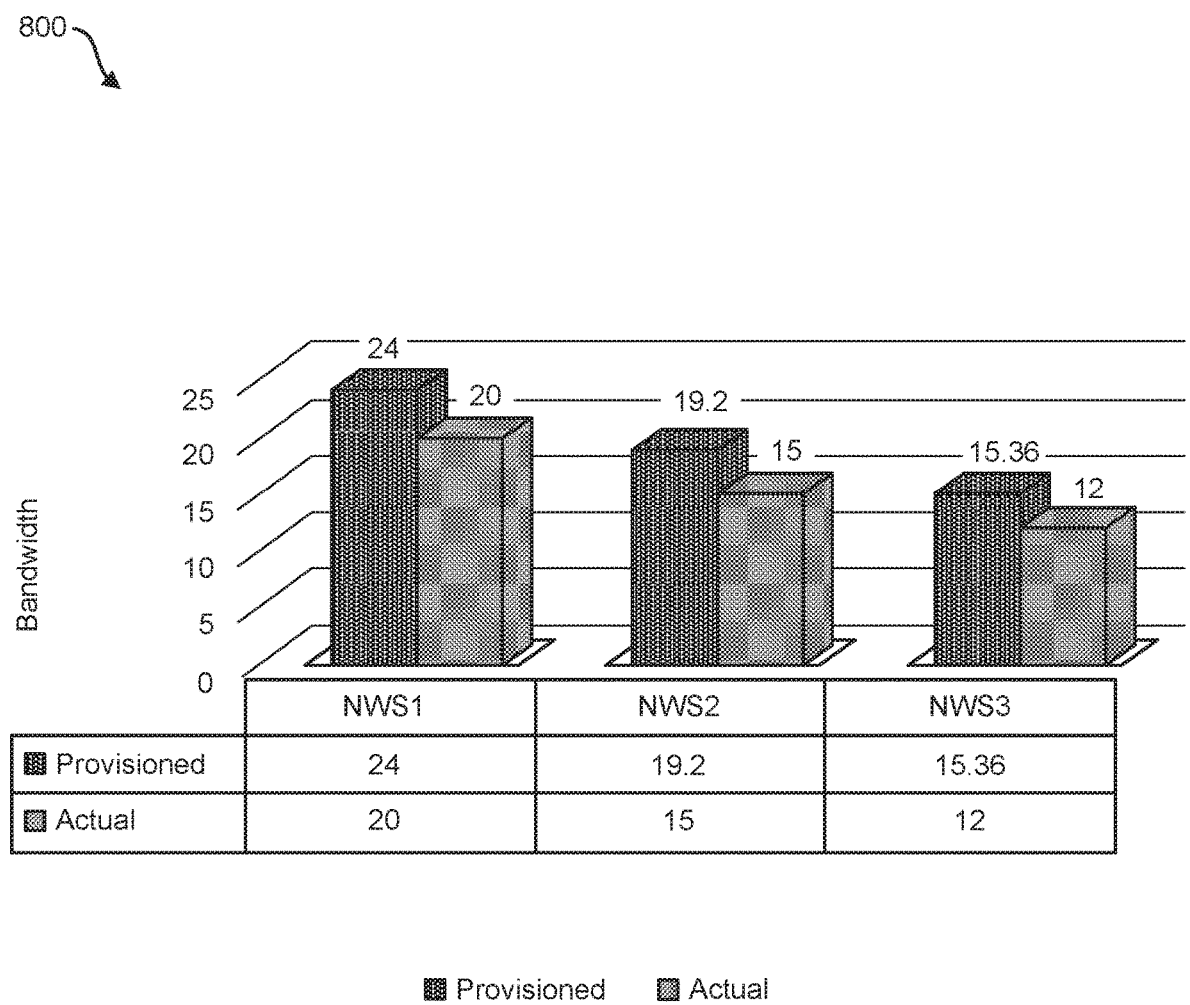
FIG. 8 is a bar graph which displays provisioned and actual bandwidths for example high-priority network software applications.

FIG. 8 is a bar graph 800 which displays the provisioned and actual bandwidths for example high-priority network software applications. The bar graph 800 represents a fourth iteration of the method described in FIG. 4 with respect to NWS1, NWS2, and NWS3. In the example shown in bar graph 800, the provisioned and actual bandwidths are a result of the re-provisioning performed in the example illustrated in FIG. 7. As shown, the actual bandwidths for NWS1, NWS2, and NWS3 remain at approximately 20 Mbps, 15 Mbps, and 12 Mbps, respectively, and the provisioned bandwidths for NWS1, NWS2, and NWS3 are set at 24 Mbps, 19.2 Mbps, and 15.36 Mbps, respectively. The $A_1/R_1$ ratio for NWS1 is approximately 0.83 which is less than the HUR (e.g., 0.90) but greater than the LUR (e.g., 0.50), therefore the provisioned bandwidth ($R_1$) for the NWS1 remains the same.

In addition, the $A_2/R_2$ ratio of NWS2 is 0.78 which is less than the HUR (e.g., 0.90) but greater than the LUR (0.50). Therefore, the provisioned bandwidth for the NWS2 remains the same. Furthermore, the $A_3/R_3$ ratio of NWS3 is 0.78 which is less than the HUR but greater than the LUR (0.50). Accordingly, if the actual bandwidth ($A_3$) of NWS3 remains at 12 Mbps, the provisioned bandwidth ($R_3$) for NWS3 remains at 15.36 Mbps.

Figure 9:
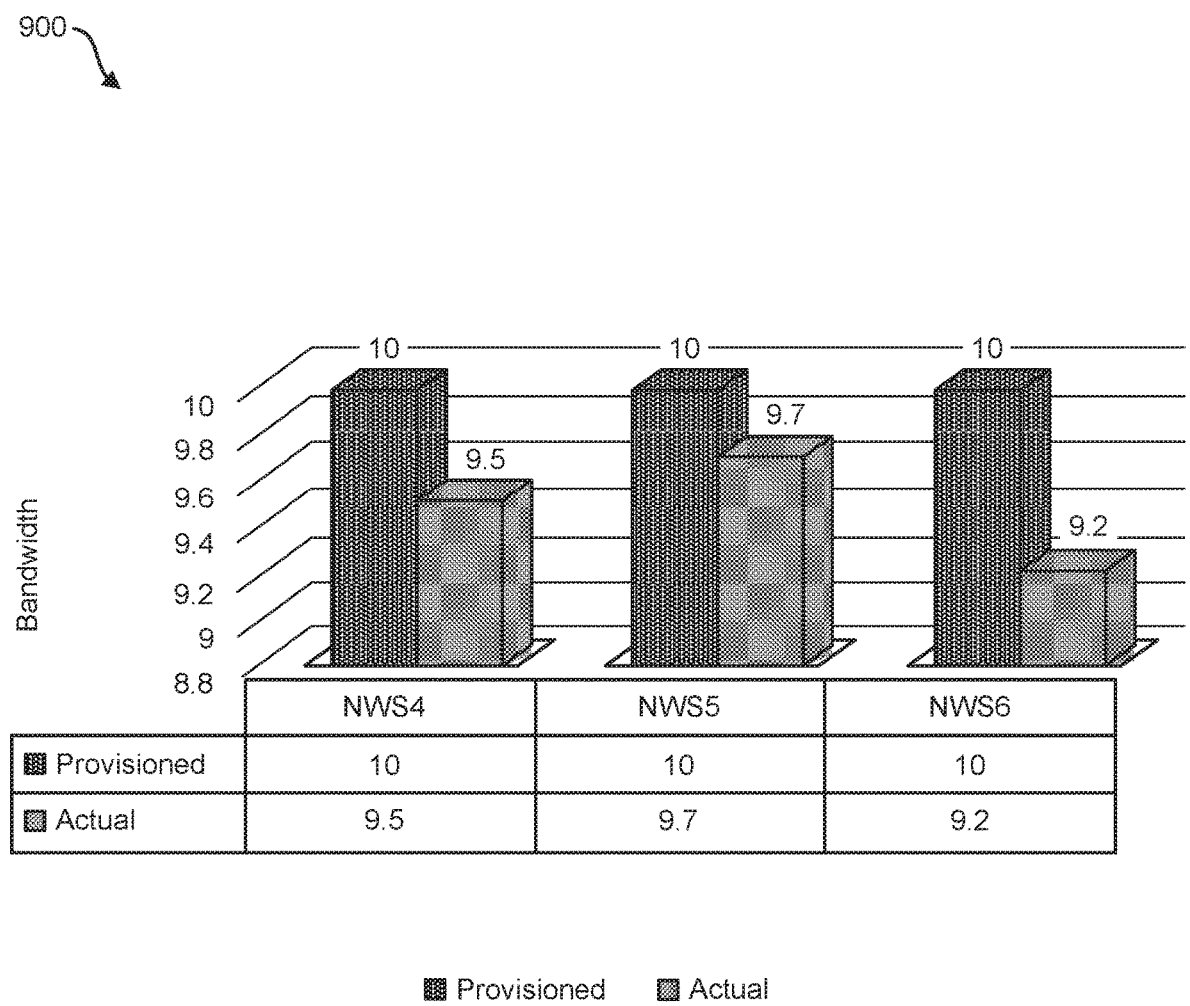
FIG. 9 is a bar graph which displays provisioned and actual bandwidths for example high-priority network software applications.

FIG. 9 is a bar graph 900 which displays provisioned and actual bandwidths for example high-priority network software applications. The bar graph 900 represents the beginning of a first iteration of the method described in FIG. 4 with respect to NWS4, NWS5, and NWS6. In particular, the example associated with bar graph 900 is a different example than the example discussed in reference to the bar graphs 500, 600, 700, and 800 in FIGS. 5-8. The bar graph 900 reveals that although the NWS4 has been provisioned a bandwidth of 10 Mbps, the actual bandwidth that is being used is approximately 9.5 Mbps which is therefore less than the provisioned amount.

Likewise, the bar graph 900 shows that although the NWS5 has been provisioned a bandwidth of 10 Mbps, the actual bandwidth ($A_5$) that is being used is approximately 9.7 Mbps which is therefore less than the provisioned amount. Further, NWS6 has also been provisioned a bandwidth ($R_6$) of 10 Mbps although the actual bandwidth ($A_6$) that is being used is approximately 9.2 Mbps. Accordingly, a system and method herein may be used to re-provision bandwidth based on the actual bandwidth (e.g., utilization) of each network software application (e.g., high-priority network software application).

Figure 10:
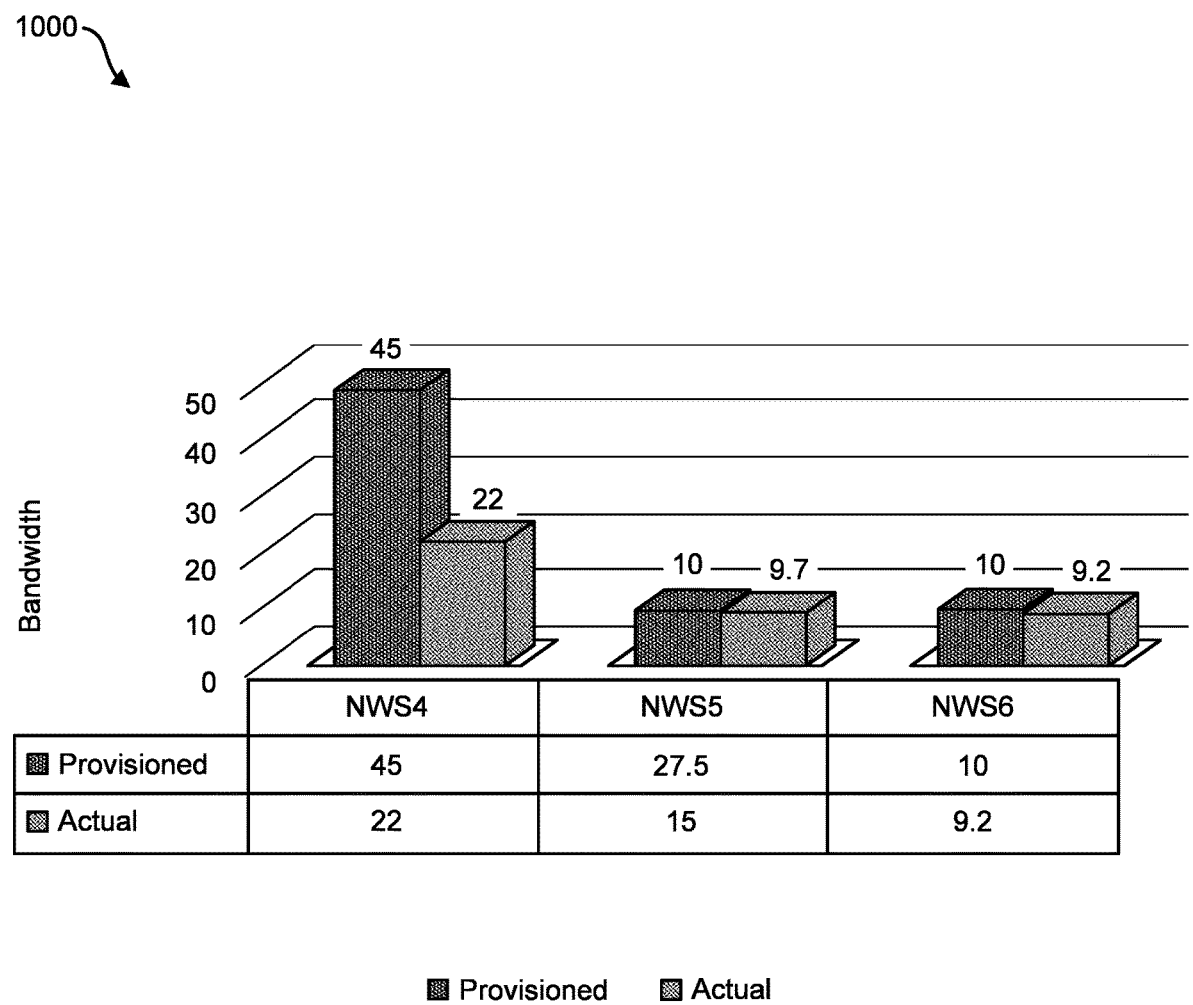
FIG. 10 is a bar graph which displays provisioned and actual bandwidths for example high-priority network software applications.
Figure 11:
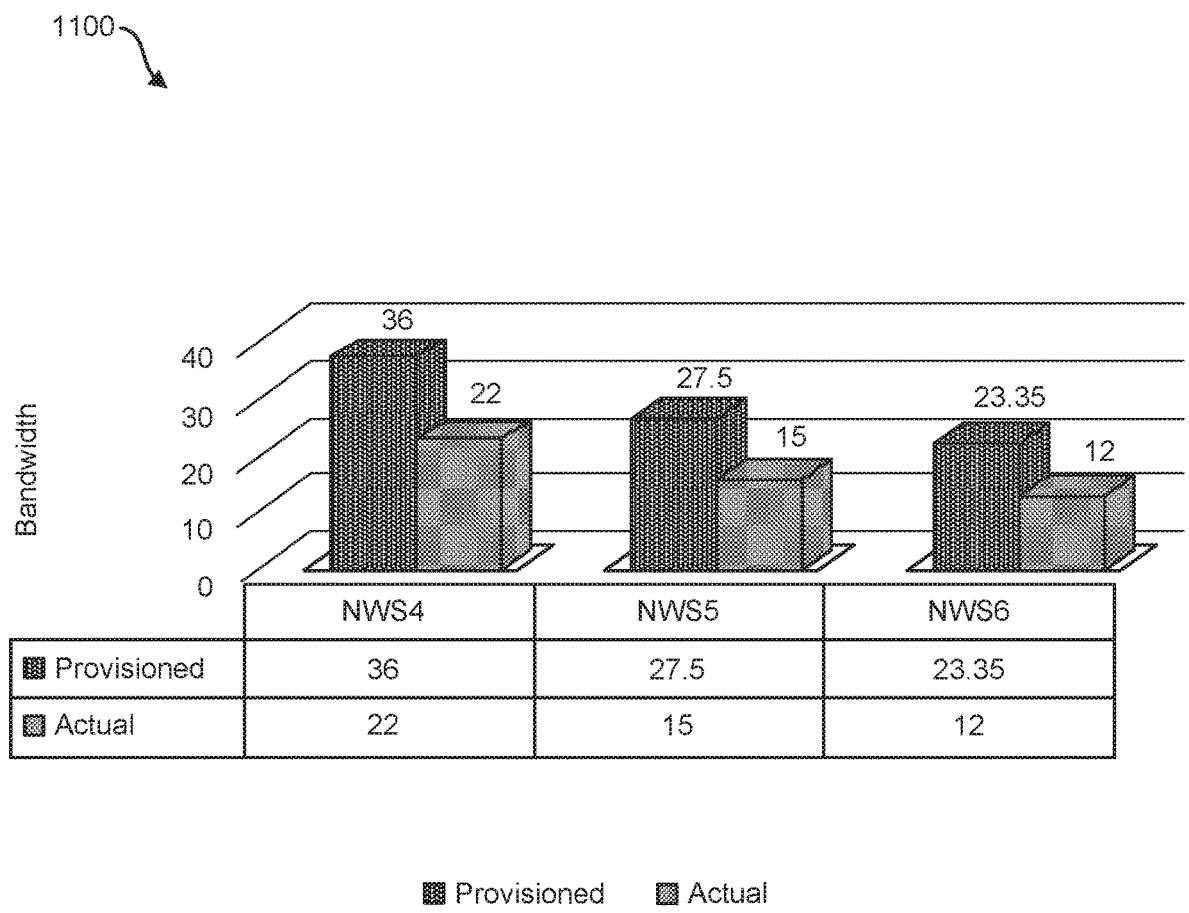
FIG. 11 is a bar graph which displays provisioned and actual bandwidths for example high-priority network software applications.

In the example illustrated in FIG. 9, the network bandwidth is 100 Mbps, the maximum attainable bandwidth is 90 Mbps, and the number of network software applications (e.g., high-priority network software applications) is three. In the example shown, the actual bandwidth ultimately consumed by each high-priority network software application after the iterations depicted in FIGS. 10 and 11 is 22 Mbps, 15 Mbps, and 12 Mbps, respectively, as shown in FIG. 11. For an HUR of 90%, an LUR of 50%, an HRR of 50% (i.e., 50% of the available bandwidth), and an LRR of 20% (i.e., 20% of the provisioned bandwidth), the method disclosed herein may be employed to re-provision bandwidth to and from the network software application. However, for the sake of example, the HUR, LUR, HRR, and LRR is set to illustrate the importance of selecting an appropriate value for the HUR, LUR, HRR, and LRR for a given network.

For the example shown in FIG. 9, the HUR and LUR for NWS4, NWS5, and NWS6 are 0.90 and 0.50, respectively. The $A_4/R_4$ ratio for NWS4 is 0.95 which is above the HUR (e.g., 0.90) and greater than the LUR (e.g., 0.50). Accordingly, because the $A_4/R_4$ ratio is greater than the HUR, the system can provision additional bandwidth to the NWS4 so long as doing so would not cause the total provisioned bandwidth to exceed the maximum attainable bandwidth. The amount of available bandwidth is equal to the network bandwidth less the sum of all provisioned bandwidth on the network (e.g., 100–$\Sigma R_i$=70 Mbps). The amount of additional bandwidth provisioned to NWS4 is 35 Mbps (e.g., 50% of 100 Mbps-30 Mbps). Therefore, after provisioning additional bandwidth to NWS4, the updated provisioned bandwidth ($R_4$) for NWS4 is 45 Mbps. After provisioning additional bandwidth to NWS4, the total provisioned bandwidth (e.g., $\Sigma R_i$) is 65 Mbps (e.g., 45 Mbps, 10 Mbps, and 10 Mbps) to the high-priority network software applications on the network. Notably, the total provisioned bandwidth (e.g., 65 Mbps) is less than the maximum attainable bandwidth (e.g., 90 Mbps).

Likewise, the $A_5/R_5$ ratio for NWS5 is 0.97 which is above the HUR (e.g., 0.90) and greater than the LUR (e.g., 0.50). Therefore, because the $A_5/R_5$ ratio is greater than the HUR, the system provisions additional bandwidth to the NWS5 from the network. The amount of available bandwidth is equal to the network bandwidth less the sum of all provisioned bandwidth (e.g., 100–$\Sigma R_i$). For an HRR of 50%, after provisioning additional bandwidth to the NWS5, the updated provisioned bandwidth ($R_5$) for NWS5 is 27.5 Mbps (e.g., 50% of 100 Mbps-65 Mbps). At this point, the total provisioned bandwidth (e.g., $\Sigma R_i$) is 82.5 Mbps (e.g., 45 Mbps, 27.5 Mbps, and 10 Mbps) to the network software applications on the network. Notably, the total provisioned bandwidth (e.g., 82.5 Mbps) is less than the maximum attainable bandwidth (e.g., 90 Mbps).

Furthermore, the $A_6/R_6$ ratio for NWS6 is 0.92 which is above the HUR (e.g., 0.90) and the LUR (e.g., 0.50). As such, because the $A_6/R_6$ ratio is greater than the HUR, the system provisions additional bandwidth to the NWS6 from the network. The amount of available bandwidth ($A_6$) is equal to the network bandwidth less the sum of all provisioned bandwidth (e.g., 100–$\Sigma R_i$). For an example HRR of 50%, provisioning additional bandwidth to NWS6 yields ($R_6$) (50% of (100 Mbps-82.5 Mbps)) 8.75 Mbps in additional bandwidth. To provision 8.75 Mbps to NWS6, the total provisioned bandwidth (e.g., $\Sigma R_i$=45 Mbps+27.5 Mbps+10 Mbps+8.75 Mbps=91.25 Mbps) must be less than the maximum attainable bandwidth (e.g., 90 Mbps) which is not the case in this example. As such, the 8.75 Mbps in additional bandwidth cannot be provisioned. As such, the provisioned bandwidth ($R_6$) for NWS6 remains at 10 Mbps.

FIG. 10 is a bar graph 1000 which displays provisioned and actual bandwidths for example high-priority network software applications. The bar graph 1000 represents the beginning of a second iteration of the method described in FIG. 4 with respect to NWS4, NWS5, and NWS6. That is, in the example shown in bar graph 1000, the provisioned and actual bandwidths are a result of the re-provisioning performed in the example illustrated with respect to FIG. 9. As shown, the actual bandwidths for NWS4, NWS5, and NWS6 are approximately 22 Mbps, 15 Mbps, and 9.2 Mbps, respectively, and the provisioned bandwidths for NWS4, NWS5, and NWS6 can be set to 45 Mbps, 27.5 Mbps, and 10 Mbps, respectively, in accordance to the method as previously described.

As with the example illustrated in FIG. 9, the network bandwidth is 100 Mbps, the maximum attainable bandwidth is 90 Mbps, the HUR is 90%, the LUR is 50%, the HRR is 50% (i.e., 50% of the available bandwidth), and the LRR is 20% (i.e., 20% of the provisioned bandwidth). The $A_4/R_4$ ratio for NWS4 is 0.49 which is below the HUR (e.g., 0.90) and below the LUR (e.g., 0.50). As such, the system re-provisions bandwidth from NWS4 back to the network. In this example, since the LRR is 20%, the amount of bandwidth provisioned away from NWS4 is (20% of 45=9), making the new provisioned bandwidth ($R_4$) 45−9=36 Mbps.

Likewise, the $A_5/R_5$ ratio for NWS5 is 0.545 which is below the HUR (e.g., 0.90) and greater than the LUR (e.g., 0.50). Therefore, the provisioned bandwidth ($R_5$) for the NWS5 remains the same. Furthermore, the $A_6/R_6$ ratio for NWS6 is 0.92 which is above the HUR (e.g., 0.90) and the LUR (e.g., 0.50). Because the $A_6/R_6$ ratio is greater than the HUR, the system provisions additional bandwidth to the NWS6 from the network. The amount of available bandwidth is equal to the network bandwidth less the sum of all provisioned bandwidth (e.g., $100-\Sigma R_i=100-73.5=26.5$. For an HRR of 50%, after provisioning additional bandwidth to the NWS5, the updated provisioned bandwidth ($R_6$) for NWS6 is 10+50% of 26.5=10+13.25=23.25 Mbps. At this point, the total provisioned bandwidth (e.g., $\Sigma R_i$) to the network software applications on the network is 86.75 Mbps (e.g., 36 Mbps+27.5 Mbps+ and 23.35 Mbps). Notably, the total provisioned bandwidth (e.g., 86.75 Mbps) is less than the maximum attainable bandwidth (e.g., 90 Mbps).

FIG. 11 is a bar graph 1100 which displays provisioned and actual bandwidths for example high-priority network software applications. In the example shown, the bar graph 1100 represents the result of the re-provisioning performed in the example illustrated with respect to FIG. 10 and the beginning of a last (e.g., third) iteration of the method described in FIG. 4 with respect to NWS4, NWS5, and NWS6. In this example, the ($A_4/R_4$=0.61)≮LUR and ($A_4/R_4$)≯HUR. Hence, no changes are applied to the provisioned bandwidth value, $R_4$. The ($A_5/R_5$=0.545)≯LUR and ($A_5/R_5$) ≯HUR. Hence, no changes are applied to the provisioned bandwidth value, $R_5$. Lastly, the ($A_6/R_6$=0.51) ≮LUR and ($A_6/R_6$)≯HUR. Hence, no changes are applied to the provisioned bandwidth value, $R_6$. At the point shown in the figure, NWS4, NWS5, and NWS6 are all within the LUR and the HUR limits and have stabilized. The system described herein periodically monitors the changes in the actual bandwidth and makes the changes to the application rate limiters. Accordingly, the present disclosure provides a network that learns from the bandwidth characteristics of the network data flows present in the network.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A non-transitory computer readable medium comprising computer executable instructions stored thereon that, when executed by one or more processing units, causes the one or more processing units to:
   determine, using a bandwidth monitor, a first bandwidth being used by a first high-priority network software application active on a network;
   determine a first ratio of the first bandwidth of the first high-priority network software application to a provisioned bandwidth assigned to the first high-priority network software application;
   in response to the first ratio being greater than a high utilization ratio for a minimum number of iterations, re-provision, using an application rate limiter, a second bandwidth to the first high-priority network software application; and
   in response to the first ratio being less than a low utilization ratio, re-provision, using the application rate limiter, a third bandwidth from the first high-priority network software application.

2. The non-transitory computer readable medium of claim 1, wherein the instructions further cause the one or more processing units to employ deep packet inspection to identify network traffic associated with the first high-priority network software application active on the network.

3. The non-transitory computer readable medium of claim 1, further comprising instructions to re-provision the second bandwidth to the first high-priority network software application in response to the first ratio being greater than the high utilization ratio for a minimum time period.

4. The non-transitory computer readable medium of claim 1, wherein re-provisioning the second bandwidth to the first high-priority network software application comprises incrementing the provisioned bandwidth in accordance with a high reconciliation rate.

5. The non-transitory computer readable medium of claim 4, wherein the instructions further cause the one or more processing units to:
   determine the high reconciliation rate as a percentage of the available non-provisioned bandwidth.

6. The non-transitory computer readable medium of claim 5, wherein the provisioned bandwidth is a first provisioned bandwidth, and wherein the instructions further cause the one or more processing units to:
   determine that the first ratio is greater than the high utilization ratio for the minimum number of iterations;
   re-provision the second bandwidth to the first high-priority network software application responsive to determining that the first ratio is greater than the high utilization ratio for the minimum number of iterations; and determine a fourth bandwidth being used by a second high-priority network software application active on the network;

determine a second ratio of the fourth bandwidth of the second high-priority network software application to a second provisioned bandwidth assigned to the second high-priority network software application;

determine that the second ratio is greater than the high utilization ratio; and determine whether additional bandwidth can be re-provisioned to the second high-priority application based at least in part on the high reconciliation rate and the available non-provisioned bandwidth after the second bandwidth is re-provisioned to the first high-priority network software application.

7. The non-transitory computer readable medium of claim 1, wherein the third bandwidth from the first high-priority network software application comprises decrementing the provisioned bandwidth in accordance with a low reconciliation rate.

8. The non-transitory computer readable medium of claim 7, wherein the instructions further cause the one or more processing units to:
determine the low reconciliation rate as a percentage of the provisioned bandwidth assigned to the first high-priority network software application.

9. The non-transitory computer readable medium of claim 1, wherein the instructions further cause the one or more processing units to deny the re-provisioning of the second bandwidth to the first high-priority network software application in response to the second ratio being greater than the high utilization ratio occurs if the re-provisioning would increase the overall provisioned bandwidth on the network beyond a maximum attainable bandwidth.

10. The non-transitory computer readable medium of claim 1, wherein to determine whether additional bandwidth can be re-provisioned to the second high-priority application the instructions further cause the one or more processing units to:
determine a total provisioned bandwidth across all high-priority network software applications after the second bandwidth is re-provisioned to the first high-priority network software application;
determine a difference between a maximum attainable bandwidth and the total provisioned bandwidth;
determine a fifth bandwidth to re-provision to the second high-priority network software application based on the high reconciliation rate applied to the difference between the maximum attainable bandwidth and the total provisioned bandwidth; and
determine whether a sum of the total provisioned bandwidth and the fifth bandwidth exceed the maximum attainable bandwidth,
wherein the fifth bandwidth is re-provisioned to the second high-priority network software application if the sum of the total provisioned bandwidth and the fifth bandwidth does not exceed the maximum attainable bandwidth.

11. The non-transitory computer readable medium of claim 1, wherein it is determined that the sum of the total provisioned bandwidth and the fifth bandwidth exceeds the maximum attainable bandwidth, the instructions further cause the one or more processing units to:

lower the high reconciliation rate to obtain a modified high reconciliation rate;
re-determine the fifth bandwidth based on the modified high reconciliation rate applied to the difference between the maximum attainable bandwidth and the total provisioned bandwidth;
determine that the sum of the total provisioned bandwidth and the re-determined fifth bandwidth does not exceed the maximum attainable bandwidth; and
re-provision the fifth bandwidth to the second high-priority network software application.

12. A non-transitory computer readable medium comprising computer executable instructions stored thereon that, when executed by one or more processing units, causes the one or more processing units to:
performing a network bandwidth access prioritization process for each of one or more high-priority network software applications active on a network, the process comprising:
determining a first bandwidth being used by a first high-priority network software application of the one or more high-priority network software applications;
determining a first ratio of the first bandwidth of the first high-priority network software application to a provisioned bandwidth for the first high-priority network software application;
in response to the first ratio being greater than a high utilization ratio for a minimum number of iterations, re-provisioning a second bandwidth to the first high-priority network software application; and
in response to the first ratio being less than a low utilization ratio re-provisioning a third bandwidth from the first high-priority network software application;
repeating the network bandwidth access prioritization process as long as there is at least one active high-priority network software application on the network.

13. The non-transitory computer readable medium of claim 12, wherein the determined first bandwidth of the first high-priority network software application includes ingress network traffic entering the first high-priority network software application and egress network traffic exiting from the first high-priority network software application.

14. The non-transitory computer readable medium of claim 12, wherein to re-provision the first bandwidth to the first high-priority network software application in response to the first ratio being greater than the high utilization ratio is contingent upon a total utilized bandwidth on the network not exceeding a total provisioned bandwidth for the network.

15. A method, comprising:
assigning a respective application rate limiter to each high-priority network software application active on a network;
employing an assigned first application rate limiter to determine a first bandwidth for a first high-priority network software application, the first bandwidth being a present bandwidth being used by the first high-priority network software application;
re-provisioning a second bandwidth to the first high-priority network software application based at least in part on a ratio of the first bandwidth of the first high-priority network software application and a provisioned bandwidth for the first high-priority network software application being greater than a high utilization ratio for a minimum number of iterations; and re-provisioning a third bandwidth from the first high-priority network software application in response to the ratio being less than a low utilization ratio.

16. The method of claim 15, further comprising:
classifying each active high-priority network software application according to network traffic flow through a firewall.

17. The method of claim 15, further comprising installing a firewall on the network wherein network traffic for each high-priority network software application traverses through the firewall.

18. The method of claim 17, further comprising associating, by a deep packet inspection (DPI) engine, each network traffic flow in the firewall with a respective corresponding high-priority network software application.

19. The method of claim 17, wherein each assigned application rate limiter determines an actual bandwidth for each network traffic flow in the firewall.

20. The method of claim 17, wherein each assigned application rate limiter controls a rate of ingress and egress for a respective corresponding high-priority network software application for each network traffic flow associated with the respective corresponding high-priority network software application.

* * * * *